3,253,032
2-(2-AMINO-α-PHENYLBENZYLAMINO) ETHANOL AND HYDROCHLORIDE SALT
Stanley C. Bell and Scott J. Childress, both of Philadelphia, Pa., assignors to American Home Products Corporation, New York, N.Y., a corporation of Delaware
No Drawing. Filed Jan. 20, 1964, Ser. No. 338,628
3 Claims. (Cl. 260—570)

The invention disclosed herein relates to compositions of matter classified in the art of chemistry as benzylamines.

The invention sought to be patented, in its principal composition aspect, resides in the concept of a chemical compound having a molecular structure in which there is attached to the benzylamine nitrogen atom of a 2-amino-α-phenylbenzylamine a hydroxyethyl group or its hereinafter disclosed equivalents.

The invention sought to be patented, in its principal process aspect, resides in the concept of reducing a 2-amino-α-substituted-benzylideneamine.

Examination of the compounds produced according to the hereinafter described processes reveals data confirming the molecular structure hereinbefore set forth. For example, the OH and NH frequencies are evident in the infrared spectra of the compounds.

The tangible embodiments of the invention possess the inherent applied use characteristic of exerting qualitatively varying psycholeptic effects in experimental animals as evidenced by pharmacological evaluation according to standard test procedure and in particular exhibit anticonvulsant activity.

The manner and process of making the invention will now be described so as to enable a person skilled in the art of chemistry to make and use the same.

The starting 2 - amino-α-substituted-benzylideneamines can be prepared as disclosed in copending application Ser. No. 297,705, filed July 25, 1963. In general, they may be prepared by reacting a selected amine with a 2-amino-benzophenone under refluxing conditions. Thus, in preparing compound 1 as shown in Scheme A below, 3.0 g. of 2-amino-5-chloro-benzophenone and 30 ml. of ethanolamine are refluxed for 4 hours followed by cooling and dilution of the reaction mixture with water. The desired product is easily isolated from the reaction mixture.

The preparative aspect of this invention is illustrated schematically for a specific embodiment in Scheme A, below, and more generally in Scheme B, to which the numerals in parentheses in the following description refer.

SCHEME A

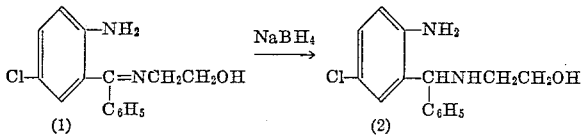

SCHEME B

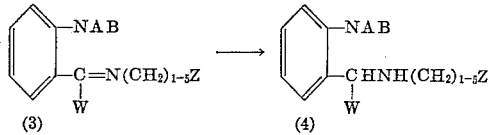

It has been found that upon treating either the α- or the β-form of 2-(2-amino-α-phenylbenzylideneamino)ethanol (1) with a reducing agent there is formed the corresponding compound, 2-(2-amino-α-phenylbenzylamino) ethanol (2), in which the exocyclic C=N linkage has been reduced.

A preferred technique for effecting the above-outlined reaction is to add an aqueous solution of sodium borohydride to a suspension consisting of the benzylidene compound and a solvent therefor such as water, benzene, alcohol or triethanolamine. The reaction mixture is then heated to 50 to 60° C., cooled, acidified with an organic acid such as acetic acid and then made basic with a strong base such as sodium hydroxide. The product is then recovered by conventional methods. The above reaction can be carried out with various reducing agents including potassium borohydride, lithium aluminum hydride, as well as by catalytic hydrogenation.

It will be apparent from the disclosure herein to those skilled in the art of organic chemistry, that, for the purposes of this invention, certain of the carbon atoms of the starting benzylideneamine (1) and (3) can be substituted with inert groups which do not interfere with the reduction of the exocyclic C=N bond. Thus, the benzenoid moiety of the starting compound can be substituted on any available position on the ring by one or more non-interfering substituents such as straight chain or branched lower alkyl having up to 9 carbon atoms in the chain, chlorine, bromine or fluorine, halo (lower)alkyl, for example, but without limitation, dichloromethyl and trifluoromethyl, and nitro. However, where the starting material is catalytically hydrogenated any nitro group thereon will be reduced to an amino group. Similarly, one or both of the hydrogens on the 2-amino group starting compound may be replaced by a substituent (Scheme B, A and B) such as, for example, but without limitation, (lower)alkyl, i.e., methyl, ethyl, propyl, pentyl and hexyl, and aralkyl, such as, for example, but without limitation, benzyl and phenethyl, lower alkanoyl, such as, for example, but without limitation, acetyl or halo (lower)alkanoyl such as chloroacetyl. However, it should be noted where lithium aluminum hydride is employed as the reducing agent it will also reduce the aforementioned acyl substituents. The starting products can also have on the exocyclic carbon a substituent (Shemes B, W) other than phenyl, such as, for example, but without limitation, a (lower)alkyl group as previously defined, an alicyclic group such as cyclohexyl, a 2-furyl, 2-, or a 3-thienyl group. Such compounds and those where W is phenyl substituted by any of the substituents present on the benzenoid moiety of the claimed structure are full equivalents of the subject matter particularly claimed.

It will be apparent to those skilled in the art that the above-described reduction is not materially affected by the chain length of the alkylene group which is attached to the exocyclic nitrogen atom. This alkylene group can have from 1 to 5 carbon atoms and can have, on its omega position, various substituents, other than hydroxy. Thus, for example, but without limitation, there can be on the nitrogen atom (Scheme B, Z), a hydrogen atom, a (lower)alkyl group having up to 5 carbon atoms, an alkoxyalkyl group having up to 5 carbon atoms, a mercapto group having up to 5 carbon atoms, or an alkylthio group having up to 3 carbon atoms. Such variations in the molecular structure of the composition aspects as hereinbefore described are considered as equivalents of the subject matter sought to be patented.

The best mode contemplated by the inventors for carrying out their invention will now be set forth as follows:

EXAMPLE 1

*Preparation of 2 - (2 - amino - 5 - chloro-α-phenylbenzylamino)ethanol*

Add a solution of 1.0 g. of sodium borohydride in 25 ml. of water to a suspension of 3.0 g. of 2-(2-amino-5-chloro - α - phenylbenzylideneamino)ethanol in 50 ml. of ethanol and heat the reaction mixture at 50–60° for 20 minutes. Cool the solution, carefully acidify with acetic acid, dilute with water and make basic with sodium hydroxide. Extract the product with ether and then from the ether with a dilute hydrochloric acid solution. Make alkaline and extract with ether. Evaporate the ether to give 2 - (2-amino-5-chloro-α-phenylbenzylamino)ethanol, which is isolated from ethanol as the hydrochloride salt, M.P. 182–184°.

It is apparent to a chemist skilled in the art that our novel compounds are basic in nature and will form acid salts with a number of organic and inorganic acids including, for example, but without limitation, hydrochloric, sulfuric, acetic and succinic acids.

The compositions of this invention may be administered parenterally or orally and may be combined with diluents, solvents, suspending agents, fillers, excipients, adhesives, coloring and flavoring agents as desired for the preparation of convenient dosage forms.

What is claimed is:

1. A compound from the group consisting of

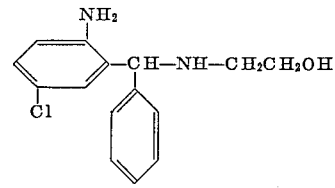

and the hydrochloric acid addition salt thereof.

2. 2 - (2-amino-5-chloro-α-phenylbenzylamino)ethanol.

3. The hydrochloride salt of 2 - (2 - amino-5-chloro-α-phenylbenzylamino)ethanol.

References Cited by the Examiner

UNITED STATES PATENTS

| | | | |
|---|---|---|---|
| 2,490,834 | 12/1949 | Rieveschl et al. | 260—570 |
| 2,603,661 | 7/1952 | Bruce et al. | 260—570 X |
| 2,655,498 | 10/1953 | Weston et al. | |
| 3,109,843 | 11/1963 | Reeder et al. | |

OTHER REFERENCES

Burger: "Medicinal Chemistry," 2nd ed., page 75 (1960).

CHARLES B. PARKER, *Primary Examiner.*